United States Patent
Smith

(10) Patent No.: US 8,679,632 B2
(45) Date of Patent: Mar. 25, 2014

(54) FUSION BONDED EPOXY COATING COMPOSITIONS THAT INCLUDE MAGNESIUM OXIDE

(75) Inventor: Mark A. Smith, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 164 days.

(21) Appl. No.: 13/145,130

(22) PCT Filed: Feb. 12, 2010

(86) PCT No.: PCT/US2010/024099
§ 371 (c)(1),
(2), (4) Date: Jul. 19, 2011

(87) PCT Pub. No.: WO2010/096345
PCT Pub. Date: Aug. 26, 2010

(65) Prior Publication Data
US 2011/0294921 A1 Dec. 1, 2011

Related U.S. Application Data

(60) Provisional application No. 61/153,879, filed on Feb. 19, 2009.

(51) Int. Cl.
*B32B 27/38* (2006.01)
*B32B 27/18* (2006.01)
*B32B 27/20* (2006.01)
*B05D 3/02* (2006.01)
*C09D 163/00* (2006.01)
*C08G 59/18* (2006.01)

(52) U.S. Cl.
USPC ........... 428/413; 427/386; 523/457; 525/523; 525/526; 525/528

(58) Field of Classification Search
None
See application file for complete search history.

(56) References Cited

U.S. PATENT DOCUMENTS

| | | | |
|---|---|---|---|
| 3,876,606 | A | 4/1975 | Kehr |
| 5,066,693 | A | 11/1991 | Gupta |
| 5,108,809 | A | 4/1992 | Patil et al. |
| 5,859,153 | A | 1/1999 | Kirk et al. |
| 2001/0051227 | A1 * | 12/2001 | Jung et al. ..................... 427/486 |
| 2005/0080210 | A1 | 4/2005 | Jing et al. |

FOREIGN PATENT DOCUMENTS

| | | | |
|---|---|---|---|
| JP | 4-173831 A | 6/1992 | |
| KR | 509624 B * | 8/2005 | ........... C09D 163/00 |
| RU | 2 307 142 C1 | 9/2007 | |
| SU | 726131 | 4/1980 | |

OTHER PUBLICATIONS

Derwent abstract of KR 509624 B (2005).*
Machine translation of KR 509624 B, provided by the KIPO website (no date).*
Jeyaraj, T., et al., "Inhibition of Corrosion of Aluminium in 1.0 N NaOH by Catechol in Conjunction with Calcium Oxide", *Transactions of the SAEST* (Jan.-Mar. 2002); vol. 37, No. 1; pp. 25-28.

* cited by examiner

*Primary Examiner* — Michael J Feely
(74) *Attorney, Agent, or Firm* — Gregg H. Rosenblatt

(57) ABSTRACT

A powdered epoxy coating composition for coating a substrate. The coating composition comprises: (a) from about 50 wt % to about 90 wt % of at least one epoxy resin; (b) from about 1 wt % to about 30 wt % of at least one catechol novolak-type adhesion promoter; and (c) from about 0.1 wt % to about 5 wt % of magnesium oxide. The coating may also include from about 10 wt % to about 48 wt % of an inorganic filler. The coating composition provides improved adhesion at high temperature operating conditions and improved resistance to damage by cathodic disbondment for pipe, rebar, and other substrates.

10 Claims, No Drawings

FUSION BONDED EPOXY COATING COMPOSITIONS THAT INCLUDE MAGNESIUM OXIDE

CROSS REFERENCE TO RELATED APPLICATIONS

This application is a national stage filing under 35 U.S.C. 371 of PCT/US2010/024099, filed Feb. 12, 2010, which claims priority to U.S. Application No. 61/153,879, filed Feb. 19, 2009, the disclosure of which is incorporated by reference in its/their entirety herein.

BACKGROUND

The present disclosure relates in general to coatings for protecting metal articles and more particularly to fusion bonded epoxy coatings for pipelines intended for underwater off-shore use, above-ground use or inground implantation.

Various protective pipeline coatings are well known in the art. Additionally, federal regulations require that major pipelines be cathodically protected in order to decrease failures due to corrosion. Cathodic protection is defined as reduction or elimination of corrosion by making the metal a cathode by means of an impressed direct current or attachment to a sacrificial anode, usually magnesium, aluminum, or zinc.

While turning the pipeline structure into a cathode will decrease corrosion in general, breaks and imperfections in the pipeline coating present problems. Initially, these breaks or "holidays" are protected by the negative charge, but with time, and in part due to moisture and minerals in the soil, and in some cases aided by hot pipeline contents, this negative charge may accelerate undercutting and disbondment of the coating system in the areas of holidays.

For these reasons, the pipeline coating art has devoted attention to the task of providing cathodic disbondment resistance to the various protective coating systems employed.

U.S. Pat. No. 3,876,606 (Kehr) relates to thermosetting epoxy resin powder for coating metal articles which are said to exhibit good resistance to cathodic disbondment. The epoxy resin composition includes a homogenous blend of a polyglycidyl ether of a polyhydric phenol having a softening point of 70°-120° C., a specified dihydrazide hardening agent, and at least 15% by volume of barium sulfate and/or calcium carbonate, up to one-third of which may be substituted by mica powder. U.S. Pat. No. 5,108,809 (Patil et al.) describes a coating that includes a synthetic elastomer and/or natural rubber compound, and further includes an amphipathic metal complexing agent as a cathodic disbondment inhibitor.

U.S. Pat. No. 5,859,153 (Kirk et al.) describes a powder coating that includes an epoxy resin and a novolak compound or resin. The novolak compound is said to be useful for enhancing the adhesion of epoxy resin to metal substrates under typical powder coating conditions.

While the foregoing technologies may be useful, different powdered epoxy compositions are needed that not only adhere to metal, but also exhibit enhanced resistance to cathodic disbondment under a variety of moisture and elevated temperature conditions.

SUMMARY

Magnesium oxide and a catechol novolak-based adhesion promoter, used in the amounts disclosed herein, are used in combination to enhance the resistance to cathodic disbondment in a powdered epoxy coating composition.

In brief summary, one aspect of the present invention describes a coating composition comprising: (a) from about 50 wt % to about 90 wt % of at least one epoxy resin; (b) from about 1 wt % to about 30 wt % of at least one catechol novolak-type adhesion promoter; and (c) from about 0.1 wt % to about 5 wt % of magnesium oxide. In another aspect, the coating composition can further comprise from about 10 wt % to about 48 wt % of an inorganic filler material. All percentages are based on the total weight of the coating composition.

In another aspect, a coating composition comprises: (a) from about 50 wt % to about 90 wt % of at least one epoxy resin; (b) from about 1 wt % to about 30 wt % of at least one catechol novolak-type adhesion promoter; (c) from about 0.5 wt % to about 15 wt % of at least one curing agent; and (d) from about 0.1 wt % to about 5 wt % of magnesium oxide. All percentages are based on the total weight of the coating composition.

In another aspect, a coating composition comprises: (a) from about 50 wt % to about 90 wt % of at least one epoxy resin; (b) from about 1 wt % to about 30 wt % of at least one catechol novolak-type adhesion promoter; (c) from about 10 wt % to about 48 wt % of at least one inorganic filler material; (d) from about 0.5 wt % to about 15 wt % of at least one curing agent; and (e) from about 0.1 wt % to about 5 wt % of magnesium oxide. All percentages are based on the total weight of the coating composition.

In yet another aspect, a coating composition comprises: (a) from about 50 wt % to about 90 wt % of at least one epoxy resin; (b) from about 1 wt % to about 4 wt % of at least one catechol novolak-type adhesion promoter; (c) from about 0.5 wt % to about 15 wt % of at least one curing agent; and (d) from about 0.1 wt % to about 5 wt % of magnesium oxide. All percentages are based on the total weight of the coating composition.

In yet another aspect, a coating composition comprises: (a) from about 50 wt % to about 90 wt % of at least one epoxy resin; (b) from about 4 wt % to about 20 wt % of at least one catechol novolak-type adhesion promoter; and (c) from about 0.1 wt % to about 5 wt % of magnesium oxide. All percentages are based on the total weight of the coating composition.

In another aspect, a coating composition comprises: (a) from about 60 wt % to about 75 wt % of at least one epoxy resin; (b) from about 1 wt % to about 4 wt % of at least one catechol novolak-type adhesion promoter; (c) from about 15 wt % to about 35 wt % of an inorganic filler; (d) from about 1 wt % to about 5 wt % of a curing agent; (e) from about 0.1 wt % to 3 wt % of an accelerator; and (f) from about 0.1 wt % to about 2 wt % of magnesium oxide. All percentages are based on the total weight of the coating composition.

In some aspects, the coating composition comprises a sufficient amount of catechol novolak-type resin to effect curing of the resin without requiring an additional curative agent. In some aspects, the coating composition may further comprise a curative agent to aid with formation of a cured coating.

The disclosed powdered epoxy coating composition may be used as a protective coating on any surface. In one application, the powder is applied to a heated substrate. Upon contact with the heated substrate, the powder melts, reacts, and forms a coating. In another application, the powder is first melted and then applied to a substrate. The powder can also be electrostatically charged and the charged powder particles are then attracted to a substrate, which can be subsequently heated. The powdered epoxy is particularly suitable for coating metal objects. In particular, the powdered epoxy may be used to coat pipes for major pipelines, using conventional coating techniques to apply the coating.

The disclosure provides for an epoxy coating that has excellent resistance to cathodic disbondment, as defined below. Additionally, the epoxy coating may have improved adhesion, even under conditions of being exposed to elevated temperature conditions with exposure to moisture. Such properties are particularly desirable in pipeline coatings to maintain integrity of the coating and minimize coating failures.

These and other aspects of the invention will be apparent from the detailed description below. In no event, however, should the above summaries be construed as limitations on the claimed subject matter, which subject matter is defined solely by the attached claims, as may be amended during prosecution.

DETAILED DESCRIPTION

All concentrations are expressed as weight percent of the coating composition, unless otherwise stated. As such, the total weight percentage of the composition is 100 weight percent.

The coating composition of the present disclosure comprises an epoxy resin component, an adhesion promoter, (optionally) an inorganic filler material, and magnesium oxide. In some embodiments, the coating composition may further comprise a curative agent.

In one aspect, the coating composition may comprise from about 50 wt % to about 90 wt % of an epoxy resin component. In another aspect, the coating composition comprises from about 60 wt % to about 75 wt % of an epoxy resin component. Epoxy resins useful in compositions of the invention are well-known in the literature. In some embodiments, the epoxy resins may comprise one or more polyglycidyl ethers of bisphenol A. These are available in various epoxy equivalent weights ranging from 170 g/equivalent up to about 2500 g/equivalent. Those versions having epoxy equivalent weights above about 500 g/equivalent are solids at room temperature. Solid epoxy resins may include resins based on bisphenol A, resins based on bisphenol F, epoxy cresol novolak resins, and epoxy phenol novolak resins. Non-limiting examples of commercially available epoxy resins include EPON 2004 and EPON 1001F, both available from Hexion Specialty Chemicals, Columbus, Ohio; and D.E.R. 667E and D.E.R. 642U, available from Dow Chemical Company, Midland, Mich.; and Araldite GT 1804 from Huntsman Corp.

In one embodiment, the epoxy resin component may comprise EPON 2004 in combination with EPON 1001F in a ratio of about 92:8 (by weight).

In another aspect, the epoxy resin component may advantageously comprise an isocyanate-modified epoxy resin in combination with another epoxy resin. A non-limiting example of a commercially available isocyanate-modified epoxy resin is D.E.R. 6508, available from Dow Chemical Corporation, Freeport, Tex. In one embodiment, the epoxy resin component comprises D.E.R. 6508 and EPON 2004 in a ratio of about 88:12 (by weight).

Adhesion Promoter

In another aspect, the coating composition employs a catechol novolak-type adhesion promoter in a range of from about 1 wt % to about 30 wt %. In another aspect, the coating composition employs a catechol novolak-type adhesion promoter in a range of from 4 wt % to 30 wt %. In another aspect, the coating composition may comprise a catechol novolak-type adhesion promoter in a range of from about 1 wt % to about 4 wt %. Useful adhesion promoters may comprise novolak resins selected from catechol novolak resins, cresol catechol novolak resins, polyhydroxyphenol-end capped novolak resins, and combinations thereof. Suitable non-limiting examples of novolak-type adhesion promoters are described in U.S. Pat. Nos. 5,859,153 (Kirk et al.) and 6,911,512 (Jing et al.), the entire disclosures of which are expressly incorporated herein by reference.

In some embodiments, catechol novolak-type adhesion promoters may comprise compounds of the following formula (I):

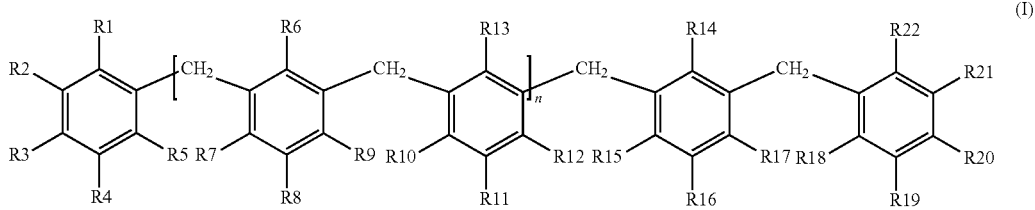

(I)

wherein:
$R^1$, $R^2$, $R^3$, $R^4$, and $R^5$ are each independently selected from the group consisting of —OH, —SH, —H, $C_{1-20}$ alkyl, —F, —Cl, —Br, —I, alkoxy, aryl, alkaryl, and alkenyl groups;

$R^1$, $R^2$, $R^3$, $R^4$, and $R^5$ are selected such that at least two vicinal groups selected from the group consisting of —OH, —SH, and combinations thereof are present on a ring structure to which $R^1$, $R^2$, $R^3$, $R^4$, and $R^5$ are attached;

one of the groups selected from the group consisting of $R^6$, $R^7$, and $R^9$ are —OH or —SH and the remainder of the groups selected from the group consisting of $R^6$, $R^7$, and $R^9$ are selected independently from the group consisting of —H, $C_{1-20}$ alkyl, —F, —Cl, —Br, —I, alkoxy, aryl, alkaryl, and alkenyl groups;

$R^8$ is selected from the group consisting of $C_{1-20}$ alkyl, —H, —F, —Cl, —Br, —I, alkoxy, aryl, alkaryl, and alkenyl groups;

$R^{11}$ is selected from the group consisting of —OH and —SH;

$R^{10}$ and $R^{12}$ are each independently selected from the group consisting of —OH, —SH, —H, $C_{1-20}$ alkyl, —F, —Cl, —Br, —I, alkoxy, aryl, alkaryl, and alkenyl groups; wherein at least one of $R^{10}$ and $R^{12}$ is —OH or —SH;

$R^{13}$ is selected from the group consisting of —H, $C_{1-20}$ alkyl, —OH, —SH, —F, —Cl, —Br, —I, alkoxyl, aryl, alkaryl, and alkenyl groups;

one of the groups selected from $R^{14}$, $R^{15}$, and $R^{17}$ are —OH or —SH and the remainder of the groups selected from the group consisting of $R^{14}$, $R^{15}$, and $R^{17}$ are independently selected from the group consisting of —H, $C_{1-20}$ alkyl —F, —Cl, —Br, —I, alkoxy, aryl, alkaryl, and alkenyl groups;

$R^{16}$ is selected from the group consisting of $C_{1-20}$ alkyl, —H, —F, —Cl, —Br, —I, alkoxy, aryl, alkaryl, and alkenyl groups;

$R^{18}$, $R^{19}$, $R^{20}$, $R^{21}$, and $R^{22}$ are each independently selected from the group consisting of —OH, —SH, —H, $C_{1-20}$ alkyl, —F, —Cl, —Br, —I alkoxy, aryl, alkaryl, and alkenyl groups;

$R^{18}$, $R^{19}$, $R^{20}$, $R^{21}$, and $R^{22}$ are selected such that at least two vicinal groups selected from the group consisting of —OH, —SH, and combinations thereof are present on a ring structure to which $R^{18}$, $R^{19}$, $R^{20}$, $R^{21}$, and $R^{22}$ are attached; and n is an integer of zero or greater.

In some embodiments, catechol novolak-type adhesion promoters may comprise compounds of formula (I) wherein:

$R^2$, $R^3$, $R^{20}$, and $R^{21}$ are each independently selected from the group consisting of —OH and —SH;

$R^1$, $R^4$, $R^5$, $R^{18}$, $R^{19}$, and $R^{22}$ are each independently selected from the group consisting of —H and $C_{1-20}$ alkyl groups;

$R^6$ and $R^{14}$ are each independently selected from the group consisting of —OH and —SH;

$R^8$ and $R^{16}$ are each independently selected from the group consisting of $C_{1-20}$ alkyl, —H, —F, —Cl, —Br, and —I;

$R^7$, $R^9$, $R^{15}$, and $R^{17}$ each represent —H;

$R^{11}$ is selected from the group consisting of —OH and —SH;

$R^{10}$ and $R^{12}$ are independently selected from the group consisting of —H, —SH, —H, $C_{1-20}$ alkyl, —F, —Cl, —Br, —I, alkoxy, aryl, alkaryl, and alkenyl groups; wherein at least one of $R^{10}$ and $R^{12}$ is —OH or —SH; and $R^{13}$ is selected from the group consisting of $C_{1-20}$ alkyl, —H, —F, —Cl, —Br, —I, alkoxy, aryl, alkaryl, and alkenyl groups.

In some embodiments, catechol novolak-type adhesion promoters may comprise compounds of formula (I) wherein:

$R^2$, $R^3$, $R^6$, $R^{10}$, $R^{11}$, $R^{14}$, $R^{19}$, and $R^{20}$ each represent —OH;

$R^1$, $R^4$, $R^5$, $R^7$, $R^9$, $R^{12}$, $R^{13}$, $R^{15}$, $R^{17}$, $R^{18}$, $R^{21}$, and $R^{22}$ each represent —H; and $R^8$ and $R^{16}$ each represent —CH$_3$.

In some exemplary embodiments, catechol novolak resins may be blended with phenolic resins to provide useful adhesion promoters. An example of a useful phenolic resin is D.E.H. 87 (a hydroxyl-terminated phenolic hardener available from Dow Chemical Co., Freeport, Tex.).

In some embodiments, the adhesion promoter may be a blend of at least one catechol novolak resin and D.E.H. 87 in a ratio of about 20:80 (by weight).

In one aspect, the catechol novolak resin comprises a compound of the following formula (II):

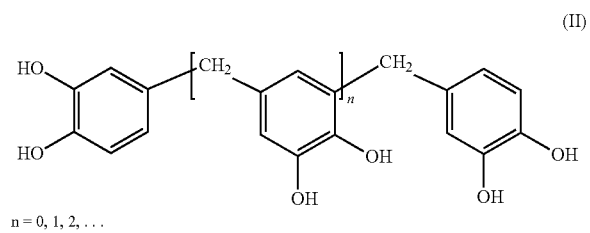

(II)

n = 0, 1, 2, ...

wherein n is an integer from 0 to 10. In another aspect, n can be an integer from 0 to 2.

Inorganic Fillers

In another aspect, the coating composition of the present disclosure further includes from 10 wt % to 48 wt % of an inorganic filler. In another aspect, the coating composition of the present disclosure may include from about 15 wt % to about 35 wt % of an inorganic filler. In another aspect, the coating composition of the present disclosure may include from about 20 wt % to about 30 wt % of an inorganic filler. Examples of suitable filler materials may include calcium metasilicate, barium sulfate, calcium sodium aluminum silicate, calcium carbonate, and combinations thereof. In some exemplary embodiments, the inorganic filler may be a combination of calcium metasilicate and barium sulfate. Examples of suitable commercially available filler materials include: NYAD M325 (NYCO Minerals, Inc., Willsboro, N.Y.); Vantalc 2000, Vansil W 20 and W 50 (Vanderbilt R. T. Company, Inc., Norwalk, Conn.); Minspar 3, 4, 7, and 10 (Imerys Performance Materials, Roswell, Ga.); Purtalc 6030, available from Charles B. Chrystal Co., Inc., New York, N.Y.; Cimbar PC available from CIMBAR, Cartersville, Ga.; Feldspar G-200 available from Feldspar Corporation, Atlanta, Ga.; Sparton 41 available from Heemskirk Canada Limited, Calgary, Alberta, Canada; Huberbrite 10 available from Huber Engineered Materials, Atlanta, Ga.; and ExBar 200, 325 and 400, available from Excalibar Minerals, LLC, Houston, Tex.

In some embodiments, the inorganic filler component may optionally not be required, depending on the particular coating needs. For example, a coating composition for coating rebar with a coating that resists cathodic disbondment may comprise an epoxy resin component, an adhesion promoter, magnesium oxide, and optional additional materials described below, without requiring an inorganic filler component.

Magnesium Oxide

In another aspect, the coating composition of the present disclosure comprises from about 0.1 wt % to about 5 wt % of magnesium oxide. In some embodiments of the coating composition, magnesium oxide may be present in an amount of from 0.1 wt % to 3 wt %. In some embodiments of the coating composition, magnesium oxide may be present in an amount of from about 0.1 wt % to about 2 wt %. Commercially available magnesium oxide include MAGLITE A, available from HallStar, Chicago, Ill.; and MagChem 10 available from Martin Marietta Magnesia Specialties, Raleigh, N.C.

The coating composition of the present disclosure may also include additional materials in varying concentrations as individual needs may require. For example, the composition may further include curatives or curing agents, pigments, accelerators, flow promoting agents, wax, fluidizing agents, and combinations thereof.

Curative Agent

In some embodiments, the coating may include from about 0.5 wt % to about 15 wt % of a curative or curing agent. In some embodiments, the coating may include from 0.5 wt % to 5 wt % of a curative or curing agent. In some embodiments, the coating may include from about 1 wt % to about 3 wt % of a curative or curing agent. Examples of suitable curatives include, but are not limited to: phenolic hardeners, dicyandiamide, imidazoles, anhydrides, amines, polyamides, dihydrazides, carboxylic acids and carboxylic acid functional resins. Examples of suitable commercially available curatives may include: Dicyandiamid AB 04, available from Degussa Corporation, Parsippany, N.J.; DEH 85 and DEH 87 Epoxy Curing Agent, available from Dow Chemical Corporation, Freeport, Tex.; Amicure CG, Amicure CG-NA, Amicure CG-325, Amicure CG-1200, Amicure CG-1400, Dicyanex 200-X, Dicyanex 325, and Dicyanex 1200, available from Air Products and Chemicals, Inc., Allentown, Pa.; Dyhard 100M, available from AlzChem LLC, Atlanta, Ga.; and Aradur 3082, 9664-1, and 9690 available from Huntsman Advanced Materials, The Woodlands, Tex.

In some embodiments, the catechol novolak-type adhesion promoter may be present in an amount of from about 4 wt % to about 30 wt % of the total weight of the coating composition, and in these embodiments it may not be necessary to add a separate curing agent. While not being bound by any theory, it is thought that the catechol novolak-type adhesion promoter may have a curative effect when present in these amounts.

Pigment

Examples of suitable commercially available pigments include, but are not limited to: Titanium Dioxide SMC 1108, available from Special Materials Company, Doylestown, Pa.; Ti-Pure R-960, available from DuPont, Wilmington, Del.; Hostaperm Green GC 01 available from Clariant Pigments and Additives, Clariant, R.I.; and Phthalocyanine Green Toner, available from Sun Chemical Co., Parsippany, N.J.

Accelerator

An accelerator may be present in the coating composition at a concentration of from about 0.1 wt % to about 3 wt %. Examples of suitable accelerators include, but are not limited to: imidazoles, anhydrides, polyamides, aliphatic amines, epoxy resin-amine adducts, and tertiary amines. An example of a suitable commercially available accelerator includes, but is not limited to, EPI-CURE Curing Agent P100, available from Hexion Specialty Chemicals, Columbus, Ohio.

Flow Modifier

A flow modifier may be present in the coating composition at a concentration of from about 0.2 wt % to about 2 wt %. Examples of suitable flow modifiers include, but are not limited to: degassing or defoaming agents, leveling agents, and wetting agents. Example of suitable commercially available flow promoting agents include Resiflow PF67, available from Estron Chemical, Incorporated, Calvert City, Ky.; and BYK-360 P, available from BYK Chemie, Wallingford, Conn.

Wax

A wax may be present in the coating composition at a concentration of from about 0.1 wt % to about 2 wt %. Examples of suitable waxes include, but are not limited to: polyethylene wax, synthetic wax, and polytetrafluoroethylene. Examples of commercially available waxes include MPP 620F, available from Micro Powders, Inc., Tarrytown, N.Y. and Ceraflour 980 available from BYK Chemie, Wallingford, Conn.

Exemplary embodiments of the present coating composition provide improved adhesion at high temperature operating conditions and improved resistance to damage by cathodic disbondment for pipe, rebar, and other substrates. In some exemplary embodiments the cured coatings from about 0.1 wt % to about 5 wt % of magnesium oxide show improved adhesion performance at elevated temperatures with exposure to moisture. The ability of these coatings to show improved adhesion performance at elevated temperatures with exposure to moisture is important even in some applications where cathodic protection of the coating is not required. In some exemplary embodiments the cured coatings from about 0.1 wt % to about 5 wt % of magnesium oxide show improved resistance to cathodic disbondment.

The coating compositions of the present disclosure are more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

EXAMPLES

All parts, percentages, ratios, etc., in the examples and elsewhere herein are by weight unless indicated otherwise.

Materials Used

Amicure CG-1400: a dicyanamide curative, available from Air Products and Chemical, Inc., Allentown, Pa.

Catechol novolak blend—a 20:80 blend of catechol novolak resin and phenolic hardener resin, equivalent to the "ACN blend" described in U.S. Pat. No. 6,911,512.

Curezol C-17Z: an accelerator, available from Shikoku Chemicals Corp., Tokushima, Japan.

DER 6508: isocyanate-modified epoxy resin, available from Dow Chemical Corporation, Freeport, Tex.

Dyhard 100M: a dicyanamide curative, available from AlsChem LLC, Atlanta, Ga.

EPI-CURE P100: an accelerator, available from Hexion Specialty Chemicals, Columbus, Ohio.

EPON 2004 and EPON 1001F: epoxy resins, available from Hexion Specialty Chemicals, Columbus, Ohio.

ExBar W 400: barium sulfate, available from Excalibar Minerals, LLC, Houston, Tex.

Maglite A: magnesium oxide, available from HallStar, Chicago, Ill.

MPP 620F: a polyethylene wax, available from Micro Powders, Inc., Tarrytown, N.Y.

Phthalocyanine Green Toner: a toner, available from Sun Chemical Co., Parsippany, N.J.

Polycal OS 325: calcium oxide, available from Mississippi Lime, Ste. Genevieve, Mo.

Resiflow PF67: a flow control agent, available from Estron Chemical, Incorporated, Calvert City, Ky.

SMC 1108: a titanium dioxide pigment, available from Special Materials Company, Doylestown, Pa.

Vansil W20: an inorganic filler material, available from R.T. Vanderbilt Company, Inc., Norwalk, Conn.

General Procedures

Steel panel specimens for Cathodic Disbondment Testing (CDT) and Hot Water Adhesion Testing (HWT) of lab applied coatings were hot rolled steel with dimensions of 4 inch×4 inch×0.25 inch. Laboratory-coated test specimens were prepared as follows:

1. The steel specimens were solvent washed (in accordance with SSPC-SP1) with methylethylketone followed by an isopropanol rinse.
2. The dry steel surface was grit-blasted to a near-white finish in accordance with NACE No. 2/SSPC-SP10 1508501-5A2.5.
3. The steel specimens were pre-heated in an oven for approximately one hour. For coatings where the base resin was D.E.R. 6508, the oven was set at 450° F.; for coatings where the base resin was EPON 2004, the oven was set at 480° F.
4. The steel specimens were dipped into a fluid bed for an appropriate length of time (from about 1 second to about 10 seconds) so as to give a coating thickness between 14 and 16 mils.
5. The coated specimens were placed in a post-cure oven. For coatings where the base resin was D.E.R. 6508, the oven was set at 450° F. and the coated specimens were kept in the oven for 5 minutes; for coatings where the base resin was EPON 2004, the oven was set at 480° F. and the coated specimens were kept in the oven for 2 minutes.
6. For coatings where the base resin was EPON 2004, the coated specimens were then air-cooled for 1 minute; for coatings where the base resin was D.E.R. 6508, this step was eliminated.
7. The coated specimens were then quenched in a water bath for 2 minutes.

Canadian Standards Association (CSA) Z245.20-06-12.8 Cathodic Disbondment Test

This test is a measurement of the ability to resist cathodic disbondment. The laboratory-coated panel specimens were treated as follows:
1. A 0.125 inch (3.2 mm) diameter holiday was drilled into the center of the panel.
2. The test cell, constructed using a clear polycarbonate tube 3" OD×¼" wall×6" long, was attached to the FBE surface using 3M Brand Super Silicone #08663 or equivalent.
3. 3% sodium chloride in deionized water was used as the electrolyte in each cell.
4. The platinum wire used as the anode was inserted through a hole in the top of the cell and a potential difference of −1.5 VDC was applied.
5. The samples were placed in an air circulating oven at 95° C.
6. The actual potential difference and the level of the electrolyte were checked periodically and adjusted as necessary.
7. At the end of the test period, adhesion near the holiday was evaluated within one hour by making eight radial cuts and using a utility knife with leveraging action to chip off the coating. The disbondment was measured from the edge of the holiday along the radial cuts and the results were averaged.
8. All values reported are the average of the results obtained on 3 test panels unless otherwise noted.

Canadian Standards Association (CSA) Z245.20-06-12.14 Hot Water Adhesion Test

This test is a measurement of the ability to maintain adhesion under extended hot water conditions.
1. Fresh tap water was preheated to the temperature specified prior to immersion of the test specimens.
2. The test specimens were placed in the preheated water and submerged fully.
3. The test specimens were kept submerged for the length of time specified (typically 28 days).
4. Upon removal of the specimen and while the test specimen was still warm, a utility knife was used to scribe an approximately 30×15 mm rectangle through the coating to the substrate
5. The test specimen was air-cooled to 20±3° C.
6. Within 1 hour after removal from heat, the tip of the utility knife was inserted under the coating at a corner of the scribed rectangle.
7. A levering action was used to remove the coating. This process was continued until either all of the coating in the rectangle was removed or the coating demonstrated a definite resistance to the levering action.
8. The adhesion of the coating within the rectangle was assigned a rating as follows:
    Rating 1—coating cannot be removed cleanly.
    Rating 2—less than 50% of the coating can be removed.
    Rating 3—more than 50% of the coating can be removed, but the coating demonstrates a definite resistance to the levering action.
    Rating 4—the coating can be easily removed in strips or large chips.
    Rating 5—the coating can be completely removed as a single piece.
9. All values reported are the average of the results obtained on 3 test panels unless otherwise noted.

Preparation of Powdered Epoxy Coating Samples

Example formulations were made using a mixing and extruding process. A sample of the coating was prepared by dry blending the resins, curative, filler, magnesium oxide, pigments, accelerator, and flow modifier to the correct relative amounts in a high shear mixer (Thermo Prism model #B21R 9054 STR/2041) at about 4000 revolutions per minute (rpm). After premixing, the samples were melt-mixed using a twelve-inch co-rotating twin screw extruder model #MP-2019 at a throughput range from about 50-60 grams per minute. The extruded material was then ground and a fluidizing agent, here fumed silica, was added to the desired wt %. The final formulation was then blended again using a high shear mixer at 4000 rpm. After mixing, the material was screened using a sieve with a 60 mesh screen.

Examples 1 and 2, and Comparative Example A

Examples 1 and 2 are a powdered epoxy composition prepared in accordance with an exemplary embodiment of the present disclosure, with component concentration of EPON 2004, EPON 1001F, Dyhard 100M, EPI-CURE P100, SMC 1108, Phthalocyananine Green Toner, Resiflow PF67, catechol novolak blend, MPP 620F, Vansil W20, and either Polycal OS 325 or Maglite A, respectively, as provided in Table 1. Comparative Example A is a comparative composition with EPON 2004, EPON 1004F, Dyhard 100M, EPI-CURE P100, SMC 1108, Phthalocyanine Green Toner, Resiflow PF67, catechol novolak blend, MPP 620F and Vansil W20 as also provided in Table 1. The amounts shown in Table 1 are given as both relative parts by weight (parts per hundred weight resin, phr) and as weight percent of the coating composition (wt %).

TABLE 1

|  | Comparative Example A | | Example 1 | | Example 2 | |
| --- | --- | --- | --- | --- | --- | --- |
|  | phr | wt % | phr | wt % | phr | wt % |
| EPON 2004 | 92 | 64 | 92 | 64 | 92 | 64 |
| EPON 1001F | 8 | 5.5 | 8 | 5.5 | 8 | 5.5 |
| Dyhard 100M | 2.0 | 1.4 | 2.0 | 1.4 | 2.0 | 1.4 |
| EPI-CURE P100 | 1.2 | 0.83 | 1.2 | 0.83 | 1.2 | 0.83 |
| TiO2 | 0.85 | 0.59 | 0.85 | 0.59 | 0.85 | 0.59 |
| Green toner | 0.03 | 0.02 | 0.03 | 0.02 | 0.03 | 0.02 |
| Resiflow PF67 | 0.57 | 0.39 | 0.57 | 0.39 | 0.57 | 0.39 |
| Catechol novolak blend | 3.5 | 2.4 | 3.5 | 2.4 | 3.5 | 2.4 |
| MPP-620F | 0.23 | 0.16 | 0.23 | 0.16 | 0.23 | 0.16 |
| Wollastonite | 36.1 | 25.0 | 34.1 | 23.6 | 34.1 | 23.6 |
| CaO | 0 | 0 | 2.0 | 1.4 | 0 | 0.00 |
| MgO | 0 | 0 | 0 | 0.00 | 2.0 | 1.4 |

Table 2 shows the results for coated steel panel specimens in the Hot Water Adhesion Test and Cathodic Disbondment Test. Example 1 shows strongly improved performance in the Hot Water Adhesion Test, and Example 2 shows strongly improved performance in the Hot Water Adhesion Test as well as in the Cathodic Disbondment Test.

TABLE 2

| | Hot Water Adhesion Test (95° C., 28 days) | Cathodic Disbondment Test (95° C., 28 days) |
|---|---|---|
| Comparative Example A | 3 | 29.19 mm |
| Example 1 | 1 | 26.50 mm |
| Example 2 | 1 | 4.51 mm |

Examples 3 and 4, and Comparative Example B

Examples 3 and 4 are a powdered epoxy composition prepared in accordance with an exemplary embodiment of the present invention, with component concentration of DER 6508, EPON 2004, Amicure CG-1400, Curezol C-17Z, SMC 1108, Phthalocyananine Green Toner, Resiflow PF67, catechol novolak blend, ExBAR 400, Vansil W20, and Maglite A, as provided in Table 3. Comparative Example B is a comparative composition with DER 6508, EPON 2004, CG-1400, Curezol C-17Z, SMC 1108, Phthalocyananine Green Toner, Resiflow PF67, catechol novolak blend, ExBAR 400 and Vansil W20 as also provided in Table 3. The amounts shown in Table 3 are given as both relative parts by weight (parts per hundred weight resin, phr) and as weight percent of the coating composition (wt %).

TABLE 3

| | Comparative Example B | | Example 3 | | Example 4 | |
|---|---|---|---|---|---|---|
| | phr | wt % | phr | wt % | phr | wt % |
| DER 6508 | 87.95 | 55.23 | 87.95 | 55.06 | 87.95 | 54.55 |
| EPON 2004 | 12.05 | 7.57 | 12.05 | 7.54 | 12.05 | 7.47 |
| Amicure CG-1400 | 3.84 | 2.41 | 3.84 | 2.40 | 3.84 | 2.38 |
| Curezol C-17Z | 1.43 | 0.90 | 1.43 | 0.90 | 1.43 | 0.89 |
| TiO2 | 1.9 | 1.2 | 1.9 | 1.2 | 1.9 | 1.2 |
| Green toner | 0.10 | 0.06 | 0.10 | 0.06 | 0.10 | 0.06 |
| Resiflow PF67 | 1.25 | 0.79 | 1.25 | 0.78 | 1.25 | 0.78 |
| Catechol novolak blend | 8.19 | 5.14 | 8.19 | 5.13 | 8.19 | 5.08 |
| ExBAR 400 | 30.69 | 19.27 | 30.69 | 19.21 | 30.69 | 19.03 |
| Wollastonite | 11.83 | 7.43 | 11.83 | 7.41 | 11.83 | 7.34 |
| MgO | 0 | 0.00 | 0.50 | 0.31 | 2.0 | 1.24 |

Table 4 shows the results for coated steel panel specimens in the Hot Water Adhesion Test and Cathodic Disbondment Test. Note that for the Hot Water Adhesion Test, two individual score results are reported for each Example.

TABLE 4

| | Hot Water Adhesion Test (95° C., 28 days) | Cathodic Disbondment Test (95° C., 28 days) |
|---|---|---|
| Comparative Example B | 3.3 | 12.47 mm |
| Example 3 | 2.2 | 8.42 mm |
| Example 4 | 3.3 | 8.49 mm |

The tests and test results described above are intended solely to be illustrative, rather than predictive, and variations in the testing procedure can be expected to yield different results. The foregoing detailed description and examples have been given for clarity of understanding only. No unnecessary limitations are to be understood therefrom.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather by the structures described by the language of the claims, and the equivalents of those structures. To the extent that there is a conflict or discrepancy between this specification and the disclosure in any document incorporated by reference herein, this specification will control.

What is claimed is:

1. A powdered epoxy coating composition comprising:
   from about 50 wt % to about 90 wt % of at least one epoxy resin;
   from about 1 wt % to about 30 wt % of at least one catechol novolak-type adhesion promoter; and
   from about 0.1 wt % to about 5 wt % of magnesium oxide,
   wherein all weight percentages are based on the total weight of the coating composition, wherein the catechol novolak-type adhesion promoter comprises one of a catechol novolak resin and a blend of a catechol novolak resin and a phenolic resin in a ratio of about 20:80 by weight, and wherein the catechol novolak resin comprises a compound of the formula (I):

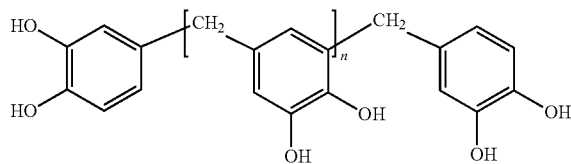

wherein n is an integer from 0 to 10.

2. The powdered epoxy coating composition of claim 1, wherein the epoxy resin comprises at least one isocyanate-modified epoxy resin in a range of about 50 wt % to 100 wt % of the total epoxy resin weight.

3. The powdered epoxy coating composition of claim 1, wherein the value of n in formula (I) is an integer from 0 to 2.

4. The powdered epoxy coating composition of claim 1, further comprising from about 10 wt % to about 48 wt % of at least one inorganic filler material.

5. The powdered epoxy coating composition of claim 1, wherein the amount of magnesium oxide is in a range of from about 0.1 wt % to about 2 wt %.

6. The powdered epoxy coating composition of claim 1, further comprising a curing agent in a range of about 0.5 wt % to about 15 wt %.

7. The powdered epoxy coating composition of claim 1, wherein the amount of the catechol novolak-type adhesion promoter is in a range of from about 4 wt % to about 20 wt %.

8. The powdered epoxy coating composition of claim 1, comprising:
   from about 60 wt % to about 75 wt % of the at least one epoxy resin;
   from about 1 wt % to about 4 wt % of the at least one catechol novolak-type adhesion promoter;
   from about 15 wt % to about 35 wt % of an inorganic filler;
   from about 1 wt % to about 5 wt % of a curing agent;
   from about 0.1 wt % to 3 wt % of an accelerator; and
   from about 0.1 wt % to about 2 wt % of the magnesium oxide,
   wherein all weight percentages are based on the total weight of the coating composition.

9. An article comprising:
a substrate having an outer surface; and
a coating deposited on at least a portion of the outer surface, wherein the coating comprises the powdered epoxy coating of claim 1.

10. A method of protecting an article, the method comprising:
coating the article with the powdered epoxy coating composition of claim 1.

* * * * *

UNITED STATES PATENT AND TRADEMARK OFFICE
CERTIFICATE OF CORRECTION

PATENT NO. : 8,679,632 B2  Page 1 of 1
APPLICATION NO. : 13/145130
DATED : March 25, 2014
INVENTOR(S) : Mark Smith It is certified that error appears in the above-identified patent and that said Letters Patent is hereby corrected as shown below:

In the Specification

Column 4
Line 60, Delete "alkoxyl," and insert -- alkoxy, --, therefor.

Column 8
Line 22, Delete "AlsChem LLC," and insert -- AlzChem LLC, --, therefor.

Column 9
Line 52, Delete "substrate" and insert -- substrate. --, therefor.

Column 10
Line 32, Delete "Phthalocyananine" and insert -- Phthalocyanine --, therefor.

Column 11
Line 17, Delete "Phthalocyananine" and insert -- Phthalocyanine --, therefor.
Line 21, Delete "Phthalocyananine" and insert -- Phthalocyanine --, therefor.

Signed and Sealed this
Eighteenth Day of November, 2014

Michelle K. Lee
*Deputy Director of the United States Patent and Trademark Office*